United States Patent

[11] 3,627,422

[72] Inventor Marvin Chodorow
    Menlo Park, Calif.
[21] Appl. No. 465,685
[22] Filed June 21, 1965
[45] Patented Dec. 14, 1971
[73] Assignee Varian Associates
    Palo Alto, Calif.

[54] MEANS FOR AVOIDING LOCKING IN RING LASERS
    12 Claims, 4 Drawing Figs.
[52] U.S. Cl. .................................................. 356/106,
    250/199, 332/7.51
[51] Int. Cl. ...................................................... G01b 9/02,
    H01s 3/10
[50] Field of Search ............................................. 331/94.5;
    88/14 EG, 14 I; 356/28, 106; 250/199

[56] References Cited
    UNITED STATES PATENTS
    3,412,251  11/1968  Hargrove .................. 250/199
    3,392,622  7/1968   Senf ........................ 331/94.5
    3,395,270  7/1968   Speller .................... 331/94.5
    3,412,251  11/1968  Hargrove .................. 250/199
    3,345,909  10/1967  De Marie ................. 88/14 EG
    3,373,650  3/1968   Killpatrick .............. 331/94.5

OTHER REFERENCES

" Microwave Modulation of Ruby Laser Light Using KDP Crystal," Saito et al., J. Appl. Phys. Japan, 2, 1963, pp. 658–9.

" Laser Systems and Applications" H. Elion, 5.2 –Gas Lasers–Pergamor (1968) pp. 39– 43 see esp. FIG. 20

Davis et al. Electromagnetic Rotation Sensing, Interim Rep. 01, Sperry 9 No. AB-1108-0016-1 Sperry Gyro Co. Great Neck, N.Y. Sept. 1963, pp. 4-1 thru and including 4—4

Smith et al., Proc. IEEE Vol. 53 No. 2 pp. 161. Feb. 1965.

Primary Examiner—Ronald L. Wibert
Assistant Examiner—R. J. Webster
Attorney—Stanley Z. Cole ABSTRACT: Means are disclosed for frequency modulating opposing modes in a ring laser assembly whereby locking is minimized or eliminated. The use of three types of modulators comprising an acoustic generator, a light shutter and an electro-optic crystal are described. In each case, the modulators are driven in accordance with a time-varying signal provided by a signal generator.

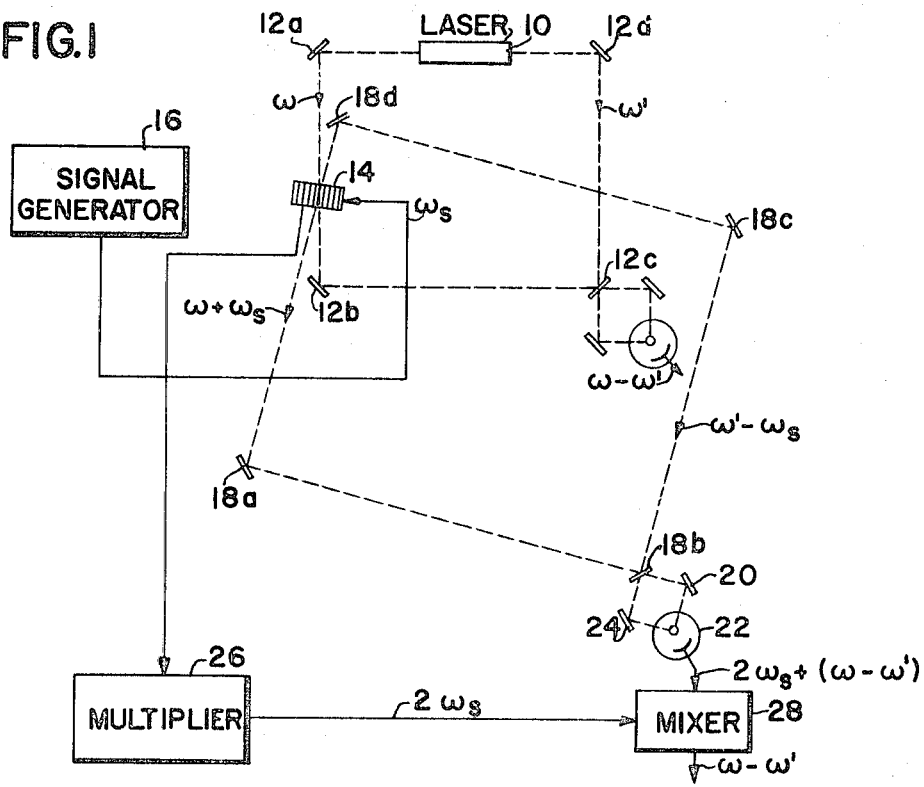
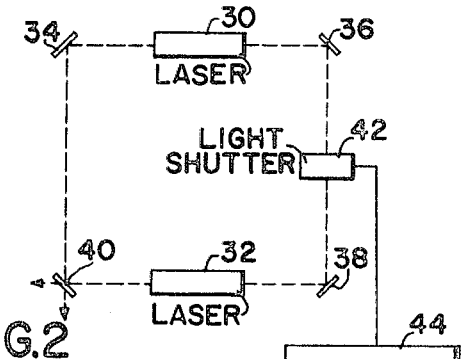
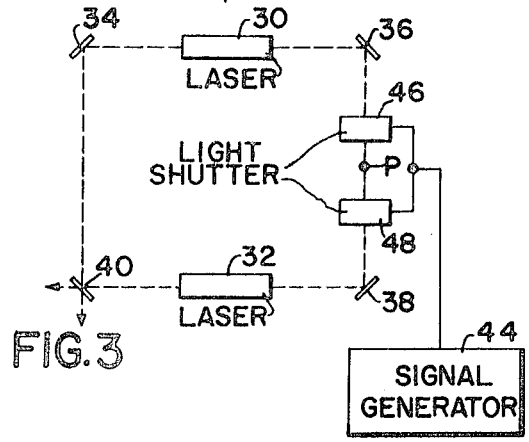
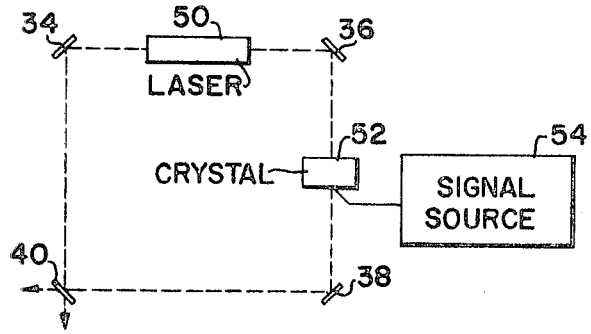

MEANS FOR AVOIDING LOCKING IN RING LASERS

This invention relates to a rotation-sensing means, and in particular to novel and improved rotating ring laser assemblies adapted for use as rotation rate indicators.

There has been proposed heretofore the use of a ring laser device for sensing the rate of rotation of a body moving in space. The device includes an active laser material and means for directing the laser radiation in a closed polygonal path or loop, and in opposing directions. As the light circulates, it is amplified and oscillation at a frequency determined by the loop length is developed. Oscillation for the wave running in either direction around the loop is established, and thus there are two oscillation modes at substantially the same frequency.

If the laser device is rotated in space, then the equivalent path length for one direction of rotation around the loop is different from the other. For the mode having a component rotating in the same direction as the rotation of the body incorporating the laser device, the total path length becomes greater, and the oscillation frequency of that mode is decreased. Conversely, for the opposite rotating wave or mode, the loop length is decreased and the frequency of oscillation increases. Thus, the frequency of rotation of the radiation in each direction is varied and the two modes now have different frequencies, the difference being proportional to the rate of rotation. In this manner, a measure of the rate of rotation may be obtained. The relationship is defined by the equation (1) $\Delta\omega = \omega_o (2\Omega/C) S/P$ where $\omega_o$ is the frequency when there is no rotation of the system, $\Delta\omega$ is the frequency difference between the two modes, $\Omega$ is the rate of rotation, $S$ is the area of the polygon, $P$ is the perimeter of the polygon, and $C$ is the velocity of light.

However, it has been observed that at very low rates of rotation there is a tendency for the two modes of counterrotating radiation to lock, whereby detection of the rotation rate is not possible. Such locking may occur as a result of internal reflections or end surface reflections of the laser itself which cause deflection of one mode into partial circulation with the other mode. Also, the laser medium is nonlinear, and may cause locking if the difference in frequency between the two modes is not large enough.

An object of this invention is to provide novel and improved rotary sensors.

Another object of this invention is to provide improved ring laser assemblies that may operate as rotary sensors at very low rotation rates.

According to this invention, a rotary sensor comprises an active material or radiative device, such as a laser, and an arrangement of reflecting mirrors which, in combination, establish two modes of radiation circulating in a common closed loop, but in opposing directions. In one embodiment, a modulator, such as an acoustic crystal generator is positioned in the loop path so that a portion of each radiation wave or mode is modulated, and deflected to another combination of reflecting mirrors thereby forming a secondary closed loop, which interconnects with the first or main loop. The two opposing waves in the secondary loop are frequency shifted equally in opposite directions in proportion to the modulation frequency. As a result, the frequency of one mode in the secondary loop is greater than the frequency of the mode having the same rotational sense in the main loop by an amount determined by the modulation frequency; and conversely, the frequency of the other opposing mode is less than the corresponding mode in the main loop by the same modulation frequency. In this way, frequency lock-in is avoided at low rotation rates and also when the system is at rest.

In another embodiment of this invention, a single loop is used which incorporates one or more laser media; and an optical shutter means is interposed in the loop to avoid frequency lock-in by periodically varying the amount of transmission of radiation. Transmission from the shutter means is varied at a frequency which corresponds to the total transit time of radiation around the loop. Since the shutter transmission is small during most of the modulation cycle, radiation going in either direction around the loop gets through the shutter in appreciable amounts only for a short interval during each cycle. The net result is that the radiation in each counterrotating mode will consist of a relatively short pulse determined by the length of time that the shutter has an appreciable transmission during the modulation cycle. These pulses for each mode, which will travel around the loop in opposite directions, will pass through the shutter approximately simultaneously but because of the location of the shutter relative to the active medium, in the loop, these two pulses pass through the active medium at different times and therefore cannot interact inside the medium. One or more shutters may be utilized to minimize the interaction between the counterrotating modes and thus eliminate the locking effect.

In still another embodiment, counterrotating modes in a laser ring resonator are frequency modulated by use of an electro-optic-modulator crystal placed in a modulating electric field which varies the dielectric constant of the crystal at the modulation frequency. The modulation frequency applied is again related to the total transit time around the ring. The result is that each counterrotation mode has a cyclic frequency variation around the loop and the modulating crystal can be so placed that there is no common frequency of the two modes at any place in the loop.

The invention will be described in greater detail with reference to the drawing in which:

FIG. 1 is a schematic representation of one embodiment of the inventive system; and FIGS. 2, 3 and 4 are schematic representations of alternative embodiments of the present invention.

Similar numerals refer to similar elements throughout the drawing.

In FIG. 1, a rotary sensor apparatus comprises an active material 10, such as a continuous wave gas laser, that provides coherent radiation emanating from opposing ends. The radiation is reflected by corner mirrors 12 a–d set at substantially 45° to the impinging radiation, and as a result a closed loop is formed wherein the light traverses substantially the same path, but in opposite directions. The polygonal laser assembly acts as a resonator having two running wave modes, with the waves circulating in opposite directions. When the system is at rest, the opposing waves will circulate at substantially the same frequency $\omega_o$. However, if the system is rotating, then the two modes shift in frequency, one increasing while the other decreases, because the equivalent path length around the resonator is not the same for the two modes. Thus, if the assembly of FIG. 1 were rotating in a clockwise direction, or has a directional component that is clockwise, the clockwise-rotating wave would oscillate at a frequency that is smaller than $\omega_o$ and the counterclockwise wave would oscillate at a frequency which is greater than $\omega_o$.

In accordance with one aspect of this invention, a modulator 14 is positioned in the loop incorporating the mirrors 12 a–d, such that the light is diffracted and the frequency of oscillation for each mode is shifted. The modulator may be an acoustic generator, such as a quartz crystal or rutile, powered by a signal generator 16 at a microwave frequency $\omega_s$. As depicted in FIG. 1, the counterclockwise mode at the frequency $\omega$ is diffracted by the modulator 14, and a portion of the radiation is deflected towards a reflecting mirror 18a. The diffracted light is reflected from the mirror 18a to a semitransparent mirror 18b. A portion of the radiation is reflected from the semitransparent mirror 18b towards a reflecting mirror 18c, then to another reflecting mirror 18d, and back to the corner mirror 18a, whereby a second closed loop is formed. The radiation portion moving counterclockwise in the secondary loop is frequency shifted by the modulating frequency $\omega_s$, about 1,000 megacycles per second, by way of example, such that oscillation of this counterclockwise component occurs at a frequency $\omega + \omega_s$. Similarly, the clockwise wave at a frequency $\omega'$ in the main loop is deflected by the modulator 14 to provide a mode traversing the secondary loop in clockwise fashion, but at a frequency $\omega'-\omega_s$. Thus the two opposing modes in the secondary loop have substantially different frequencies, whereby the probability of frequency locking is virtually eliminated.

In operation, the $\omega+\omega_s$ radiation passes through the semitransparent mirror 18b to a reflecting mirror 20 and is directed to a photodetector and mixer circuit 22. Similarly the $\omega'-\omega_s$ radiation is directed through the mirror 18b to a reflecting mirror 24, and then to the sensing circuit 22. The resultant output from the circuit 22 is $2\omega_s+(\omega-\omega')$.

To obtain the desired difference signal $\omega-\omega'$, which is proportional to the rotation rate of the assembly, the $2\omega_s$ component is separated from the resultant. This is achieved by means of a multiplier 26 coupled to the modulator 14, whereby a signal frequency $2\omega_s$ is produced. This signal is applied to a mixer 28 wherein the $2\omega_s$ component derived from the sensing circuit 22 is cancelled. The remaining difference signal is $\omega-\omega'$ which is channeled to a utilization circuit that serves to compute the rate of rotation from such difference signal.

In FIG. 2, an alternative embodiment of the invention utilizes a plurality of laser devices 30 and 32, that provide opposing modes of radiation. A closed loop is formed by reflecting corner mirrors 34, 36 and 38 and semitransparent mirror 40. An output signal is obtained at the semitransparent mirror 40 by means of a sensing circuit which detects the difference between the counter rotating frequencies. An optical shutter 42 is disposed substantially equidistant between the lasers 30 and 32, and is driven by a signal generator 44 at a frequency which is a multiple of the mode spacing. The modes are spaced at frequency intervals $\Delta f=c/L$ where $c$ is the speed of light, and $L$ is the perimeter of the closed loop. The frequency of any mode $n$ is defined as $f_n=c/\lambda n$, where $\lambda$ is the wavelength of the mode.

When the shutter 42 is operated at a frequency $p\Delta f$, $p$ being an integer, a light pulse circulates continuously in either direction in synchronization with the shutter. Specifically, if the shutter consists of a crystal, modulated by an acoustic standing wave at a frequency $\Delta f/2$, then the radiation passing through during the zero crossings of the acoustic wave generated by such crystal, would be in synchronization, making one passage around the loop between each zero crossing.

During most of the acoustic cycle, light is diffracted and deflected by the acoustic wave in the crystal, and does not follow the path which affords passage through the amplifying laser devices 30 and 32. However, a portion of the light pulse does pass through without deflection during each cycle, and such nondeflected portion has a duration depending on the amplitude of the acoustic wave. In one experiment, the light pulses that passed through the crystal to the active media 30 and 32 were about $10^{-9}$ seconds in length, and were spaced approximately $10^{-8}$ seconds apart.

In accordance with the present inventive embodiment, the shutter 42 permits pulses going in opposite senses to pass through the shutter 42 simultaneously, but these opposing pulses pass through any one of the lasers 30 or 32 at different times. Thus, there is no overlap of such pulses in the lasers 30 and 32 and no coupling of the opposing modes, as long as the separation between the ends of the lasers 30 and 32 is greater than the pulse lengths. Such distance of separation may be defined as $d=c\Delta\tau$ where $\Delta\tau$ is pulse duration, and $c$ is the speed of light.

However, if there is any reflection from either laser device 30 or 32 which causes energy to be directed in reverse direction, then such energy would not be oscillating in synchronism with the operation of the light shutter 42. On the other hand, a reflection at the light shutter 42 would be synchronous with the control pulses from the signal generator 44, since the two counterrotating pulsed radiations pass the shutter 42 simultaneously.

To avoid such undesirable synchronism between the reflected radiation energy and the counterrotating pulsed radiations, and embodiment such as depicted in FIG. 3 is employed.

In FIG. 3, a plurality of light shutters 46 and 48 are disposed in a closed loop equidistantly about a point P, which is located at the same distance along the loop from the laser 30 as from the laser 32. The pulses circulate but do not overlap in the active media 30 and 32. The light shutters 46 and 48 serve as phase modulators, such that the pulses form each shutter cross at a point disposed substantially between the two light shutters 46 and 48. Thus, any reflection of a pulse from the shutter 46 at either laser 30 or 32 returns to such laser at a different time than the pulse obtained from the shutter 48; and vice versa. In other words, any reflections that develop would not be in synchronism with the pulse radiation, and thus locking would effectively be eliminated.

In FIG. 4, a ring laser assembly includes a gas laser 50 and an electro-optic modulator crystal 52, such as a potassium diphosphate (KDP) crystal, that is activated by a modulating electric field received form a signal source 54. The electric field acts on the crystal 52 so that its dielectric constant is varied, thus changing the equivalent path length through such crystal. For any portion of a rotating mode, the frequency will be determined by the total path length around the system, which also includes the equivalent path length of the modulating crystal. This measurement depends upon the instantaneous electric field in the crystal, at such time that the portion of the rotating mode is passing through the crystal. The modulating frequency that is applied to the crystal is such that any portion of the total wave train passes through the crystal at the same phase of modulation field at each transit.

If the total length around the ring is L, then the modulating frequency $\omega_m=2\pi c/L$, $c$ being the speed of light. If the applied signal is sinusoidal, then the wave train constituting the total mode will be frequency modulated at a single frequency. The change in frequency is dependent upon the amplitude of the field which is applied to the crystal 52. There will be two modes going in opposite senses, and the same instantaneous frequency of each mode will appear at the center of the KDP crystal and overlap and will also overlap at a point diametrically opposite such center. This coincidence at the diametric opposite point is due to the symmetry of the sine wave modulation and can be avoided by using periodic nonsinusoidal modulation, for example. To avoid coincidence of the waveforms of the opposite modes, at this diametric point, that is, a condition in which the frequency of the opposing waveforms are substantially the same at the diametric point, a sawtooth-type modulating wave may be applied to the crystal 52 from the signal source 54. The sawtooth wave may be produced by using a combination of $\omega_m$ and $2\omega_m$ for modulation.

There has been described herein a novel means for modulating opposing modes in a ring laser assembly, wherein locking is effectively avoided. It is understood that the scope of the present invention is not necessarily limited to the particular embodiments described above.

What is claimed is:

1. A rotary sensor having a closed path within which radiation circulates for measuring rate of rotation comprising: laser means having a laser medium disposed within and as a part of said path for providing radiation in different directions;

means for reflecting said radiation to form said closed path wherein said radiation resonates in two opposing modes; modulating means disposed in said closed path for modulating said circulating radiation at a certain frequency such that the radiation of the two circulating modes does not have the same frequency at the same time in the laser medium to prevent frequency locking of said two opposite modes within the laser medium of the radiation-providing means;

oscillator means coupled to said modulating means for applying a time-varying signal of the certain frequency to said modulating means; and means including a semitransparent means coupled to said closed path for detecting the frequencies of each of said two opposing modes.

2. A rotary sensor as in claim 1, wherein the radiation-providing means is a gas laser disposed in the closed path.

3. A rotary sensor as in claim 1, wherein the reflecting means includes mirrors disposed at the corners of such polygonal closed path.

4. A rotary sensor as in claim 1, wherein said detecting means includes a photodetector and mixer circuit for obtaining the difference signal.

5. A rotary sensor as in claim 1, wherein the modulating means includes a signal generator for providing microwave frequencies, and a crystal disposed in such closed path and coupled to said signal generator.

6. A rotary sensor for measuring rate of rotation comprising:
   at least one radiation device spaced in a polygonal closed path for providing radiation in opposite directions in such path;
   reflecting mirrors disposed at the corners of the polygon formed by the closed path, at least one of such mirrors being semitransparent;
   light shutter means for forming and passing a pulse of radiation when open, disposed in the closed path;
   signal generator means coupled to said light shutter means for modulating said shutter means so that the opposing pulses of radiation pass through the shutter means simultaneously and at different time through said radiation device.

7. A rotary sensor as in claim 6, wherein said light shutter means includes a plurality of light shutters spaced equidistantly from a point in said closed path.

8. A rotary sensing device comprising:
   laser means having a laser medium for providing opposing modes of radiation;
   reflecting means disposed to deflect such radiation into a closed path including said laser medium;
   means for frequency modulating said modes in accordance with a time-varying signal of a certain frequency to shift the frequency of such modes with respect to one another in said laser medium, whereby frequency lock-in is avoided.

9. A rotary sensing device as in claim 8, wherein said means for frequency modulating such opposing modes includes means for varying the frequency along each mode pattern so that no overlapping portions of two opposing modes inside the laser means have the same instantaneous frequency.

10. A rotary sensing device as in claim 8, wherein the frequency-modulating means comprises an electro-optic modulator crystal disposed in such path, and means for applying an electric field to said crystal.

11. A ring laser assembly including first and second closed-loop radiation paths comprising: a laser for providing coherent radiation; reflection means disposed in polygonal arrangement for directing such radiation along said first and said second closed paths, with components in opposing directions;
   modulator means coupling said first and said second closed path for diffracting and deflecting a portion of such opposing radiation components in said first path into said second path to form a second closed path of opposing components, the frequencies of the opposing components in said second path being mutually different and different from the frequencies of the components in said first path;
   means for detecting the difference in the frequencies of the components in the second path; and means for utilizing such difference to measure the rate of rotation of the assembly.

12. A ring laser assembly including first and second closed-loop radiation paths comprising:
   a gas laser for providing coherent radiation; reflecting mirrors disposed in polygonal arrangement for directing such radiation along said first and said second closed paths, with components in opposing directions;
   acoustic modulator means coupling said first closed paths for diffracting and deflecting a portion of such opposing radiation in said first path into said second path being mutually different, and different from the frequencies of the components in said first path;
   means for utilizing such difference to measure the rate of rotation of the assembly.

* * * * *